(12) United States Patent
Del Bono

(10) Patent No.: US 10,060,293 B2
(45) Date of Patent: Aug. 28, 2018

(54) BASEPLATE FOR MOUNTING AND SUPPORTING ROTATING MACHINERY AND SYSTEM COMPRISING SAID BASEPLATE

(71) Applicant: Nuovo Pignone Srl, Florence (IT)

(72) Inventor: Alessandro Del Bono, Florence (IT)

(73) Assignee: Nuovo Pignone Srl, Florence (IT)

( * ) Notice: Subject to any disclaimer, the term of this patent is extended or adjusted under 35 U.S.C. 154(b) by 167 days.

(21) Appl. No.: 14/890,950

(22) PCT Filed: May 12, 2014

(86) PCT No.: PCT/EP2014/059659
§ 371 (c)(1),
(2) Date: Nov. 13, 2015

(87) PCT Pub. No.: WO2014/184141
PCT Pub. Date: Nov. 20, 2014

(65) Prior Publication Data
US 2016/0102581 A1 Apr. 14, 2016

(30) Foreign Application Priority Data

May 14, 2013 (IT) .................... FI2013A0110

(51) Int. Cl.
*F01D 25/28* (2006.01)
*F16M 5/00* (2006.01)
(Continued)

(52) U.S. Cl.
CPC ........... *F01D 25/28* (2013.01); *F01D 15/08* (2013.01); *F01D 15/10* (2013.01); *F16M 5/00* (2013.01); *F16M 9/00* (2013.01); *H02K 7/1823* (2013.01)

(58) Field of Classification Search
CPC .......... F01D 25/28; F01D 15/08; F01D 15/10; F16M 5/00; F16M 9/00; H02K 7/1823
See application file for complete search history.

(56) References Cited

U.S. PATENT DOCUMENTS 4,501,973 A * 2/1985 Fenemore ............... F16M 1/04
248/605
4,694,190 A 9/1987 Lane et al.
(Continued)

FOREIGN PATENT DOCUMENTS

| CN | 1391030 A | 1/2003 |
| CN | 102094685 A | 6/2011 |

(Continued)

OTHER PUBLICATIONS

Unofficial English translation of IT Search Report and Written Opinion issued in connection with corresponding IT Application No. ITFI20130110 dated Feb. 20, 2014.

(Continued)

*Primary Examiner* — Sean Gugger
(74) *Attorney, Agent, or Firm* — GE Global Patent Operation

(57) ABSTRACT

The baseplate comprises a central elongate torsion and bending resisting member and at least a first load bearing cross-member, which extends transversely to the elongate torsion and bending resisting member. At least one machinery support platform is rigidly connected to the elongate torsion and bending resisting member and to the first load bearing cross-member. The elongate torsion and bending resisting member comprises vertically extending longitudinal lateral walls, where along auxiliaries of the rotating machinery are supported. The machinery support platform projects sideways beyond the longitudinal lateral walls of the elongate torsion and bending resisting member.

18 Claims, 8 Drawing Sheets

(51) Int. Cl.
  *F01D 15/08* (2006.01)
  *F01D 15/10* (2006.01)
  *F16M 9/00* (2006.01)
  *H02K 7/18* (2006.01)

(56) References Cited

U.S. PATENT DOCUMENTS

| | | | | |
|---|---|---|---|---|
| 6,230,481 | B1 * | 5/2001 | Jahr | F01D 25/28 |
| | | | | 248/678 |
| 6,449,957 | B1 * | 9/2002 | Takamatsu | F01D 25/28 |
| | | | | 60/796 |
| 6,793,458 | B2 | 9/2004 | Kawai et al. | |
| 7,552,903 | B2 | 6/2009 | Dunn et al. | |
| 7,946,554 | B2 | 5/2011 | Sassatelli et al. | |
| 8,621,873 | B2 * | 1/2014 | Robertson | F01D 25/285 |
| | | | | 248/649 |
| 2007/0079573 | A1 | 4/2007 | Sarine et al. | |
| 2009/0255437 | A1 | 10/2009 | Hachet et al. | |
| 2012/0087778 | A1 | 4/2012 | Nagao et al. | |

FOREIGN PATENT DOCUMENTS

| | | | |
|---|---|---|---|
| CN | 102926873 A | 2/2013 | |
| EP | 1764542 A1 | 3/2007 | |
| EP | 2196431 A2 | 6/2010 | |
| GB | 1537814 A | 1/1979 | |
| RU | 87882 U1 | 10/2009 | |
| RU | 2009109006 A | 9/2010 | |
| WO | 2005098303 A2 | 10/2005 | |
| WO | 2007033944 A1 | 3/2007 | |
| WO | WO 2007033944 A1 * | 3/2007 | F01D 25/28 |
| WO | 2007060158 A1 | 5/2007 | |

OTHER PUBLICATIONS

PCT Search Report and Written Opinion issued in connection with corresponding Application No. PCT/EP2014/059659 dated Jul. 7, 2014.

Unofficial English translation of Office Action issued in connection with corresponding CN Application No. 201480028134.2 dated Aug. 3, 2016.

Unofficial English Translation of Russian Office Action issued in connection with corresponding RU Application No. 2015147197 dated Mar. 28, 2018.

* cited by examiner

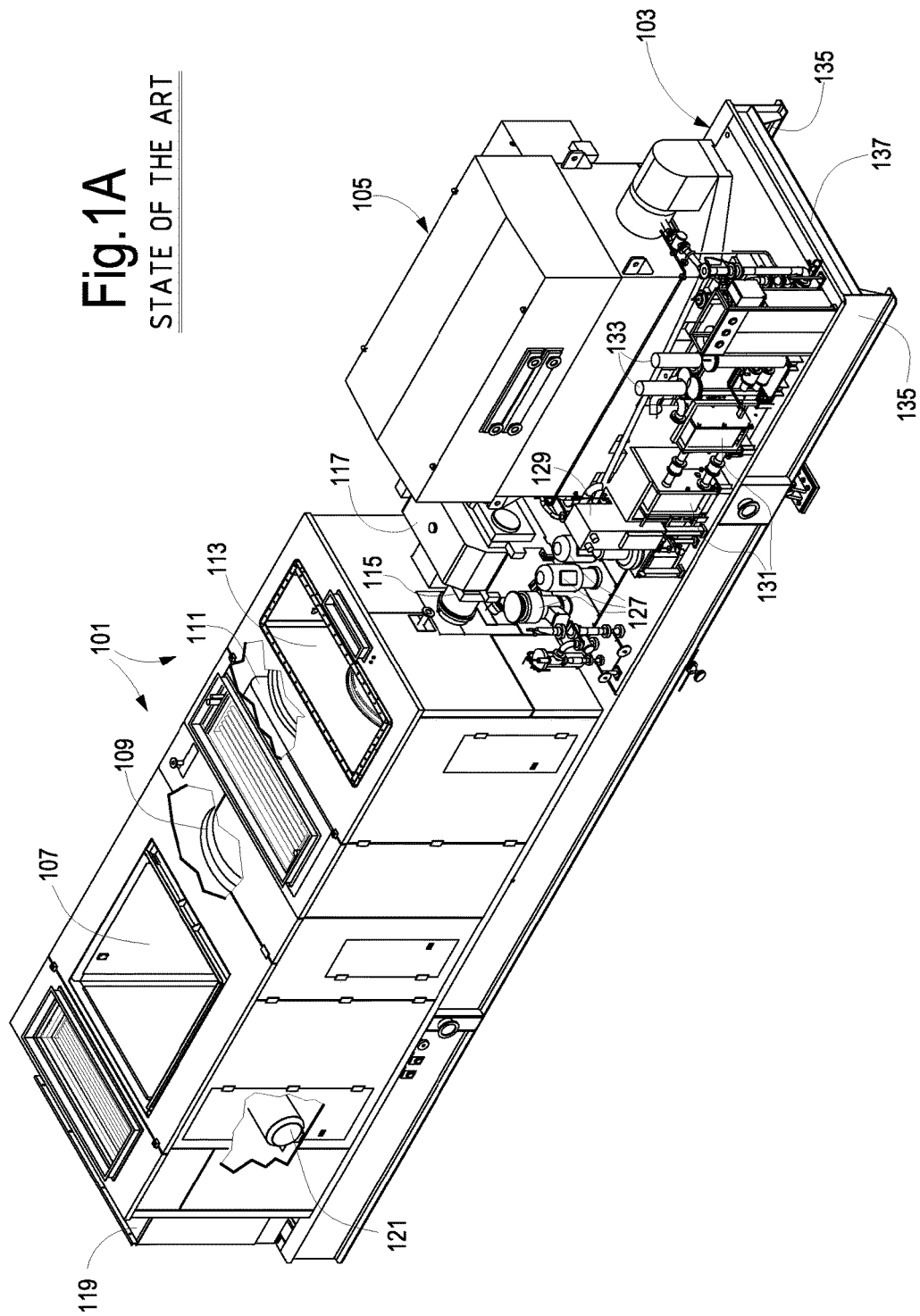

STATE OF THE ART

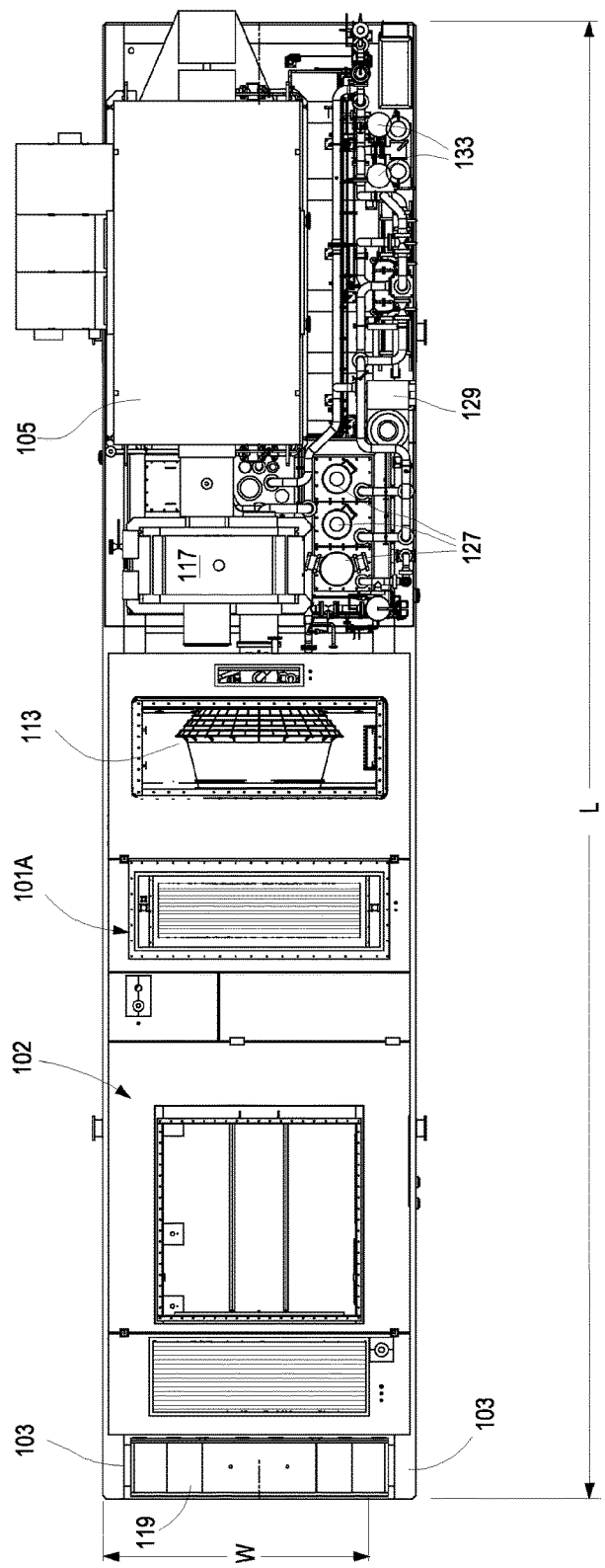

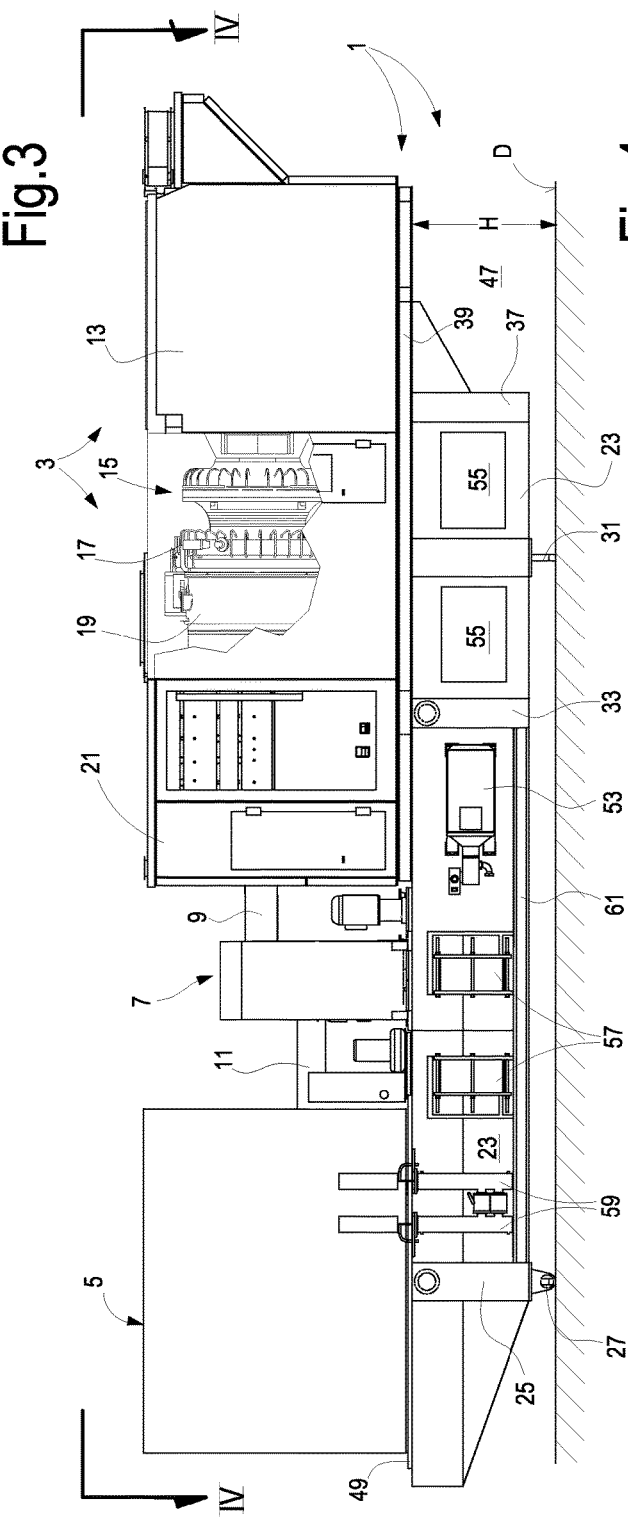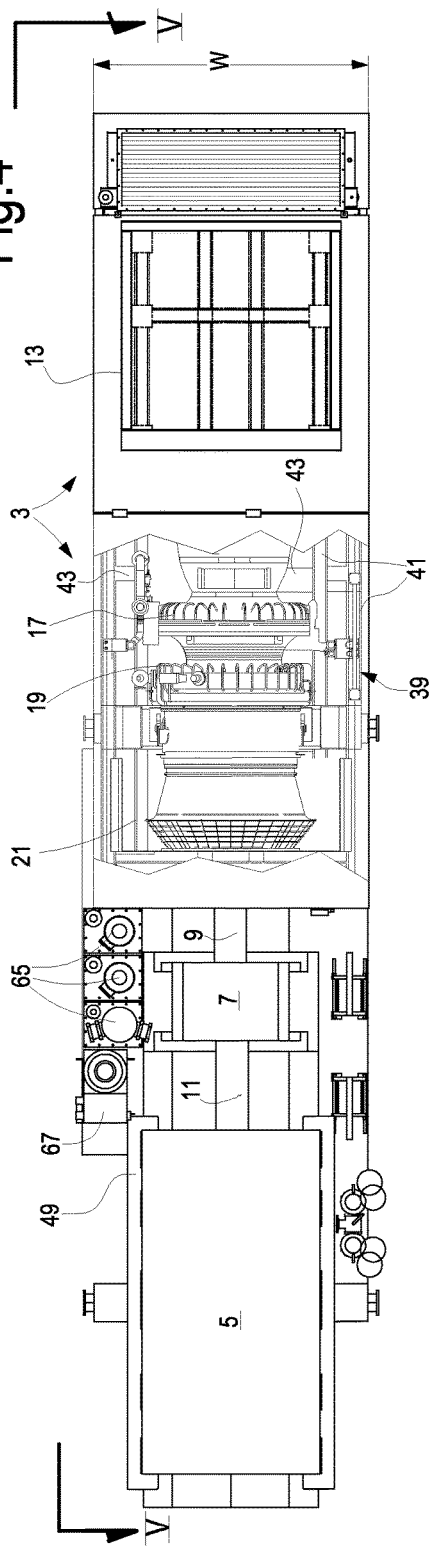

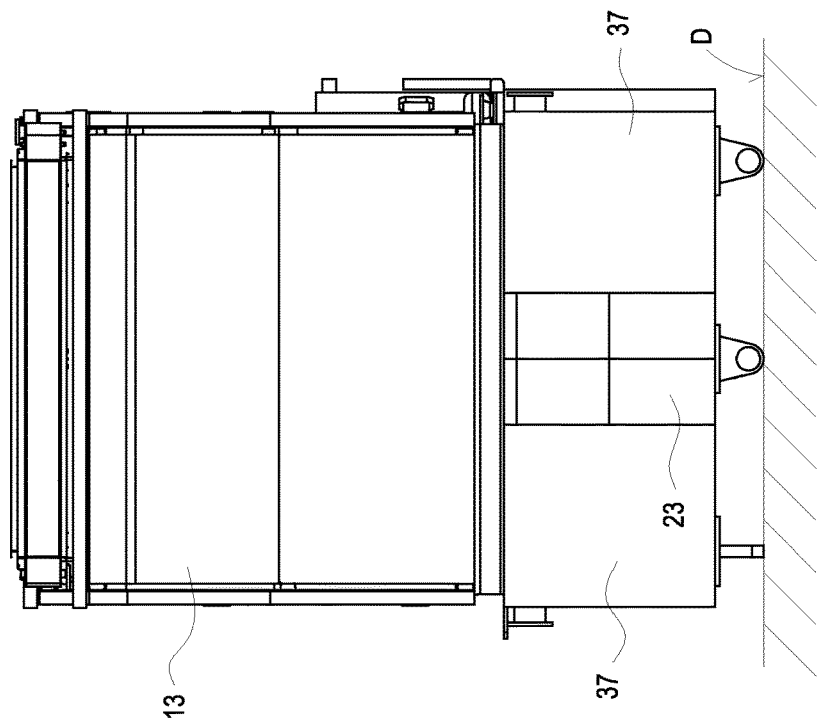
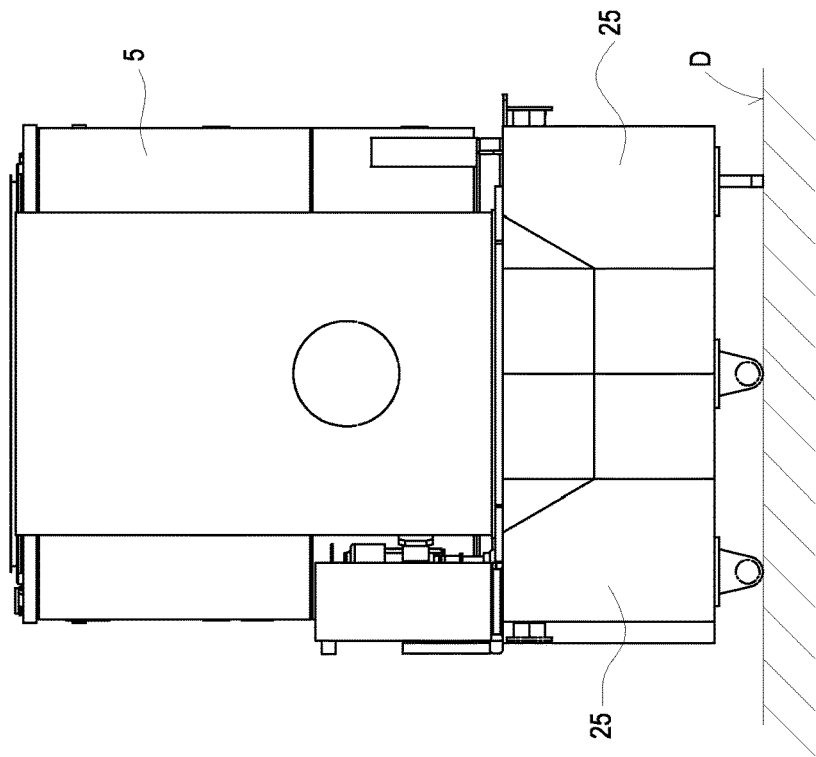

BASEPLATE FOR MOUNTING AND SUPPORTING ROTATING MACHINERY AND SYSTEM COMPRISING SAID BASEPLATE

BACKGROUND

Field of the Invention

The subject matter disclosed herein relates to improvements to baseplates for supporting rotating machinery. More specifically, the disclosure refers to baseplates for mounting and supporting systems comprising a turbine, e.g. a gas turbine, and a load, e.g. a centrifugal compressor, a pump or an electric generator with or without a speed reducer or multiplier load gear.

Description of the Related Art

In several industrial applications, for example in the gas and oil field, LNG applications and the like, it is required to support heavy machinery on a baseplate in such a manner that all the loads are adequately supported and torque generated by the machinery, also in case of sudden instantaneous failure of a driven load, can be resisted.

Typical rotating machinery which requires support on a baseplate or skid includes, but is not limited to gas turbines, electric generators, turbo compressors, such as centrifugal turbo compressors and the like.

Oil rigs and offshore platforms are often equipped with one or more gas turbines driving a load, such as an electric generator which provides electric power for the facilities of the rig.

Conventionally the rotating machinery mentioned above is mounted on a baseplate, or skid, which is secured to a deck of the platform after being leveled by suitable shims or packagings. The baseplate is dimensioned so as to withstand the static and dynamic loads generated by the machinery supported by the baseplate.

The rotating machinery arranged on the baseplate is provided with a plurality of auxiliary facilities, devices and skids including for example a fuel skid, a starter, lubricating oil circuit and relevant apparatus and devices, such as oil pumps, oil tanks and oil filters. Electric control panels are also provided, where the electronics required for controlling the rotating machines are arranged. The equipment mentioned above is by way of example of a wide range of possible auxiliaries and facilities which are required for the correct operation of the rotating machinery mounted on the baseplate.

The rotating machines as well as the auxiliaries thereof are usually arranged on a machine support platform, which is provided with a torsional resisting member and connected therewith in a torque transmitting relationship.

The rotating machinery and the auxiliaries, or at least part thereof, are usually contained in a turbine package.

The footprint of the baseplate must be sufficiently large to accommodate the above mentioned apparatus and this contributes to increasing the overall dimension of the baseplate. Access to the auxiliaries of the rotating machines is in some circumstances critical since it requires accessing the machine support platform.

FIGS. 1A and 1B illustrate different isometric views of a turbogenerator skid including baseplate and relevant rotating machinery and auxiliaries arranged thereon according to the current art. FIG. 2 illustrates a top view of the turbogenerator skid of FIGS. 1A, 1B. In this exemplary embodiment of a current arrangement, a gas turbine 101 is supported on a baseplate 103, and drives into rotation an electric generator 105. The gas turbine 101 is usually arranged within a turbine acoustic enclosure 102, which is removed in FIGS. 1A, 1B and shown only in FIG. 2. The gas turbine 101 comprises an inlet plenum 107, a gas generator 109, a power turbine 111 and an exhaust gas collector 113. The power turbine 111 is connected through a shaft 115 and a gear box 117 to the load 105. On the opposite end of the gas turbine 101 electric control panels 119 are arranged. Between the electric control panels 119 and the inlet plenum 107 a starter 121 is arranged. The starter 121 usually comprises an oil pump (visible in the drawing) which delivers oil under pressure to a hydraulic starter motor (not shown) which drives the gas turbine shaft into rotation before ignition of the fuel mixture.

The rotating machinery comprised of the gas turbine 101 and the electric generator 105 is arranged on the baseplate 103, the length L whereof is determined by the axial length of the rotating machines arranged thereon with all auxiliary systems. The width W of the baseplate 103 is determined by the transverse dimensions of the rotating machines as well as by the dimensions of the auxiliary devices and components, which must be mounted on and supported by the baseplate 103. Among those auxiliary devices, in FIGS. 1A, 1B and 2 the following are shown: the starter 121, as mentioned above; a fuel skid 125, arranged adjacent the gas turbine 101 inside the gas turbine acoustic enclosure 102; lubrication oil electric pumps 127; vapor separator for the oil tank 129; heat exchangers 131 for cooling the lubrication oil; lubrication oil filters 133; a lubrication oil tank arranged under the gear box 117 and the oil pumps 127.

The baseplate or skid 103 is comprised of a base frame formed by longitudinal beams 135 and cross beams 137 welded together to form a structure capable of supporting the static and dynamic loads generated by the rotating machines arranged on the baseplate 103.

SUMMARY OF THE INVENTION

The subject matter disclosed herein concerns an improved type of baseplate for supporting rotating machinery (e.g. a gas turbine that drives a load, such as a centrifugal compressor, an electric generator, or a pump, with or without a speed reducer or multiplier load gear).

In some embodiments the baseplate disclosed herein comprises a rectangular box shaped structure elongated in the vertical direction. The box shaped structure permits to design machinery packages with remarkable improvements in auxiliary skids accessibility and maintainability, assuring the same capability of supporting the static and dynamic loads as the traditional baseplates.

The height of the central box shaped structure allows operators to perform maintenance activities to auxiliaries, maintaining an erected and ergonomic position.

According to one aspect, a baseplate for mounting and supporting rotating machinery is disclosed, comprising: a central elongate torsion and bending resisting member; at least a first load bearing cross-member extending transversely to the elongate torsion and bending resisting member; at least one machinery support platform rigidly connected to the elongate torsion and bending resisting member and (directly or indirectly) to the first load bearing cross-member; wherein the elongate torsion and bending resisting member comprises vertically extending longitudinal lateral walls, where along auxiliaries of the rotating machinery are supported; and wherein the machinery support platform projects sideways beyond the longitudinal lateral walls of the elongate torsion and bending resisting member. The lateral walls of the elongate torsion and bending resisting member may be planar. The vertical extension thereof is more particularly sufficient for an operator to access the auxiliaries arranged under the support platform maintaining an erected and ergonomic position and accessing a space underneath the machine support platform.

In an embodiment, the load bearing cross-member is provided with vertically extending lateral walls for receiving auxiliaries of the rotating machinery, thus increasing the space available for housing the auxiliaries under the platform, in a readily accessible position for the operators.

According to a further aspect, a turbomachinery system is disclosed, comprising rotating machinery including at least a gas turbine and a load driven in rotation by the gas turbine and a baseplate. The baseplate comprises in turn a central elongate torsion and bending resisting member and at least a first load bearing cross-member extending transversely to the elongate torsion and bending resisting member extending generally parallel to a rotation axis of the gas turbine and of the load. The baseplate further includes at least one machinery support platform rigidly connected to the elongate torsion and bending resisting member and to the first load bearing cross-member, whereon the rotating machinery is constrained and supported. The elongate torsion and bending resisting member comprises vertically extending longitudinal lateral walls, where along auxiliaries of the gas turbine are supported. The machinery support platform projects sideways beyond the longitudinal lateral walls of the elongate torsion and bending resisting member.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 1A, 1B, and 2 illustrate an arrangement according to the current art;

FIG. 3 shows a side-view of one embodiment of a baseplate of a relevant rotating machine according to the present disclosure;

FIG. 4 illustrates a top view according to line IV-IV of FIG. 3;

FIGS. 8 and 9 illustrate end views of the baseplate and relevant rotating machinery supported thereon, from the side of the load and from the side of the gas turbine, respectively.

DETAILED DESCRIPTION

Figure 1B:
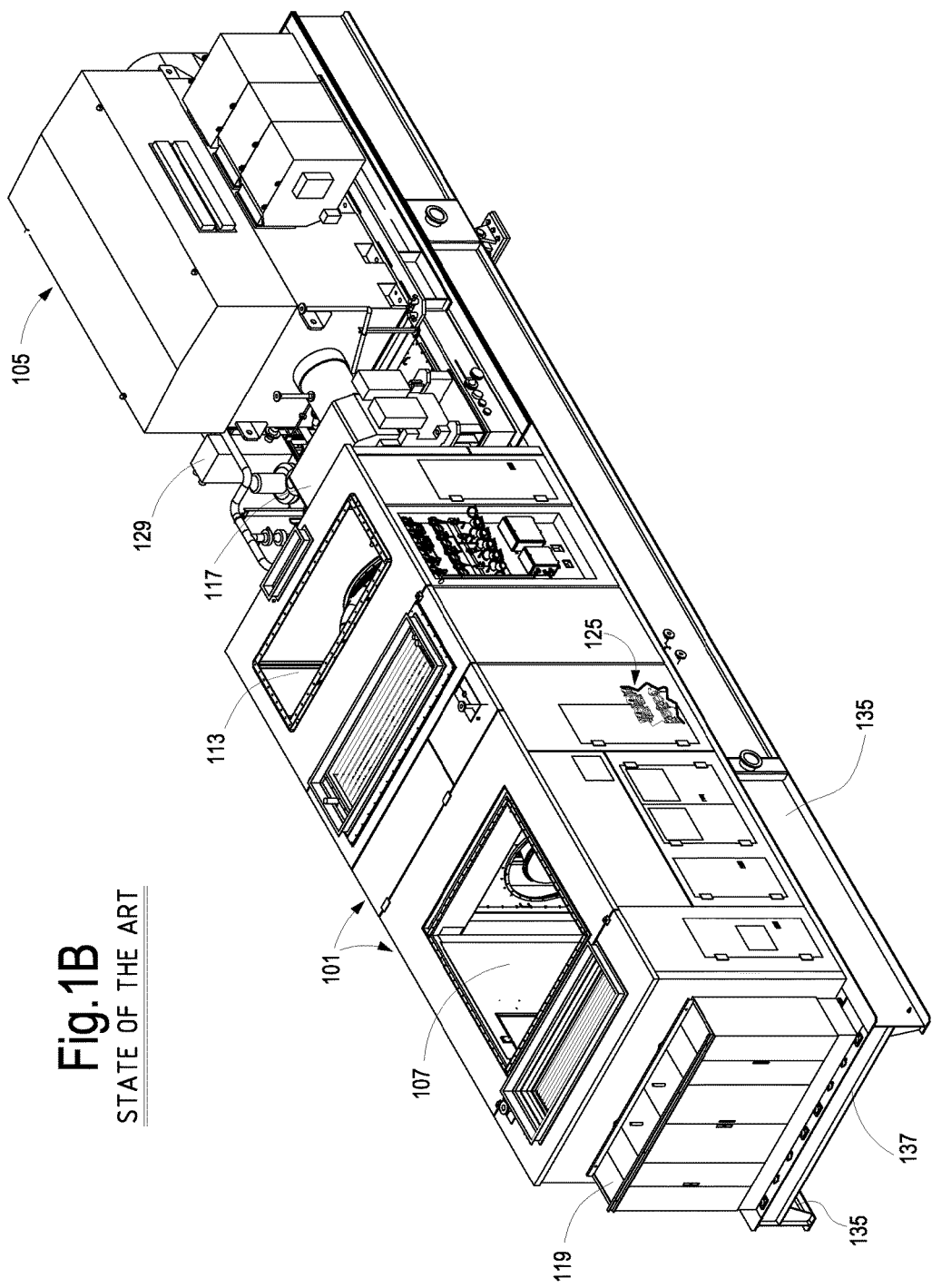
Figure 5:
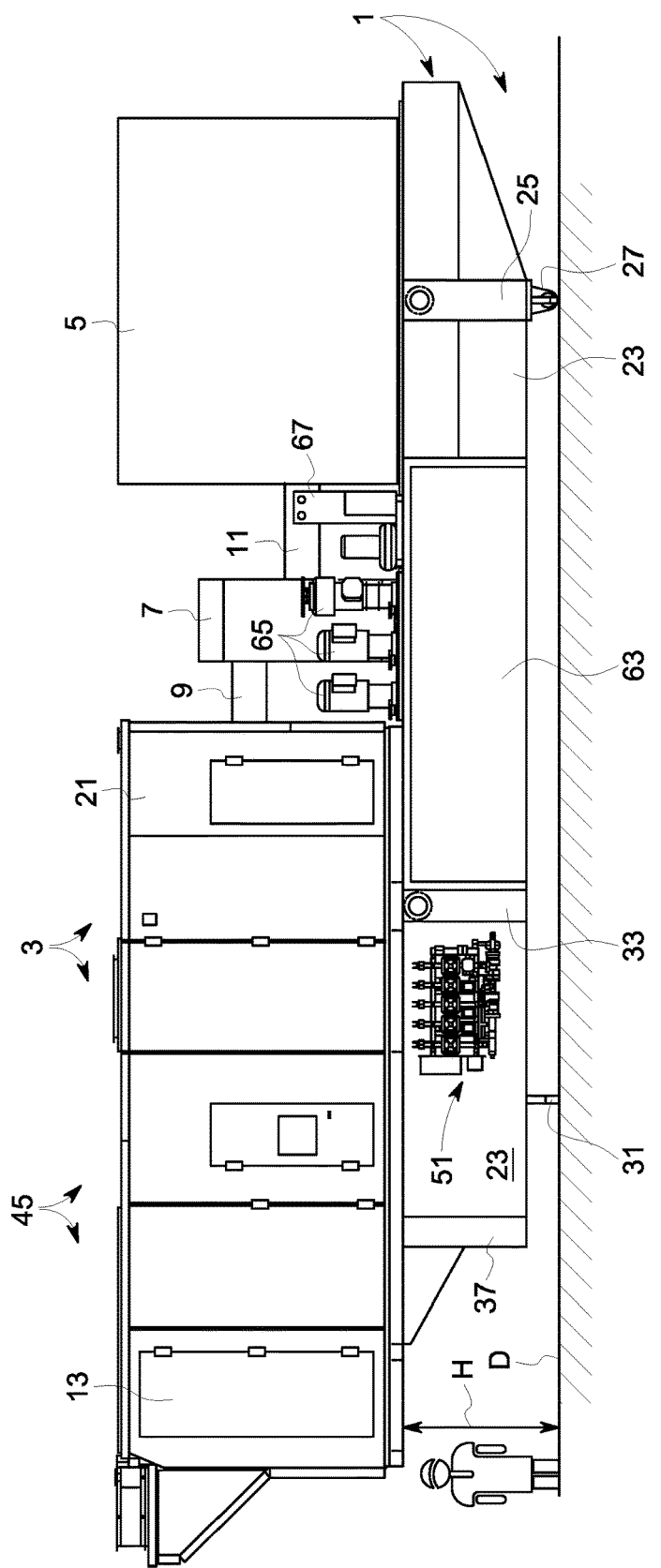
FIG. 5 illustrates a side view according to line V-V in FIG. 4.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Referring now to FIGS. 3 to 7, there is shown a baseplate or skid indicated generally at 1, for mounting and supporting rotating machinery. In some exemplary embodiments the rotating machinery arranged on and supported by the baseplate 1 comprises a gas turbine 3 and a load 5 driven by the gas turbine 3. In some embodiments the load 5 can be comprised of a compressor, e.g. a centrifugal compressor. In other embodiments the load 5 can be comprised of an electric generator. Between the gas turbine 3 and the load 5 a speed reducer or multiplier device 7 can be provided, for example a parallel axes gearbox, with vertically or horizontally oriented axes, or an epicyclical gearbox: The speed reducer or multiplier device 7 is provided when the rotation speed of the load 5 is different from the rotation speed of the gas turbine 3. An inlet shaft 9 connects the gas turbine 3 to the inlet of the speed manipulating device 7. A driven shaft 11 connects the output of the speed manipulating 7 to the load 5.

As shown in particular in FIG. 4 in some embodiments the axis of the gas turbine 3 and the axis of the load 5 can be aligned along a vertical plane, thus reducing the width of the baseplate 1, i.e. the overall footprint thereof.

The gas turbine 3 can comprise an inlet plenum 13, a gas generator 15, a combustor 17, a power turbine 19 and an exhaust gas collector 21, wherefrom the combustion gas generated by the gas turbine 3 is delivered to a stack and therefrom discharged in the atmosphere or used in a combined cycle, where the heat in the exhaust gas is used as a thermal source for a second thermodynamic cycle, or used in a co-generation system.

The baseplate 1 comprises a central elongate torsion and bending resisting member 23, which is arranged under the load 5 the gas turbine 3 and extends there along. In some embodiments the elongate torsion and bending resisting member 23 is box-shaped, for example with a rectangular cross section. In some embodiments the elongate torsion and bending resisting member 23 has an elongate cross-section, with a longer side extending vertically and a shorter side extending horizontally. For example the width (horizontal dimension) of the cross section is about half the height (vertical dimension) of the cross section of the elongate torsion and bending resisting member 23.

The baseplate 1 further comprises cross members extending transversely to the central elongate torsion and bending resisting member 23. In some embodiments, a load bearing cross member 25 is arranged crosswise under the load 5, approximately in a central position.

In an embodiment, the baseplate 1 is provided with three support members 27, 29 and 31. The three support members 27, 29 and 31 are arranged at the vertices of an isosceles triangle. The two support members 27, 29 are arranged on the bottom side of the load bearing cross member 25 substantially symmetrically with respect to a center line of the baseplate 1. In an embodiment, the third support member 31 is arranged on the bottom side of the elongate torsion and bending resisting member 23, more particularly under the gas turbine 3.

The baseplate 1 can further comprise additional cross-members 33, 37 extending transversely to the elongate torsion and bending resisting member 23 and substantially parallel to the load bearing cross member 25. The two additional cross-members 33, 37 are more particularly located in different locations along the longitudinal extension of baseplate 1. In some embodiments, two additional cross-members 33, 37 are located under the gas turbine 3. Additional cross-members can be provided between the load 5 and the gas turbine 3, according to needs. As will be explained in more detail later on, the additional cross-members 33, 37 do not require to provide a load-bearing function, but have rather the function of providing additional space for the arrangement of auxiliary devices or facilities.

In some embodiments the elongate torsion and bending resisting member 23 comprises vertically extending, planar side walls, for the purpose which will be described in greater detail here below.

In some embodiments one, some or all of the load bearing cross members 27 and additional cross members 33, 37 can comprise planar, vertically extending side walls. In some embodiments the cross-members can also have, similarly to the elongate torsion and bending resisting member 23, a rectangular cross section elongated in the vertical direction.

Figure 6:
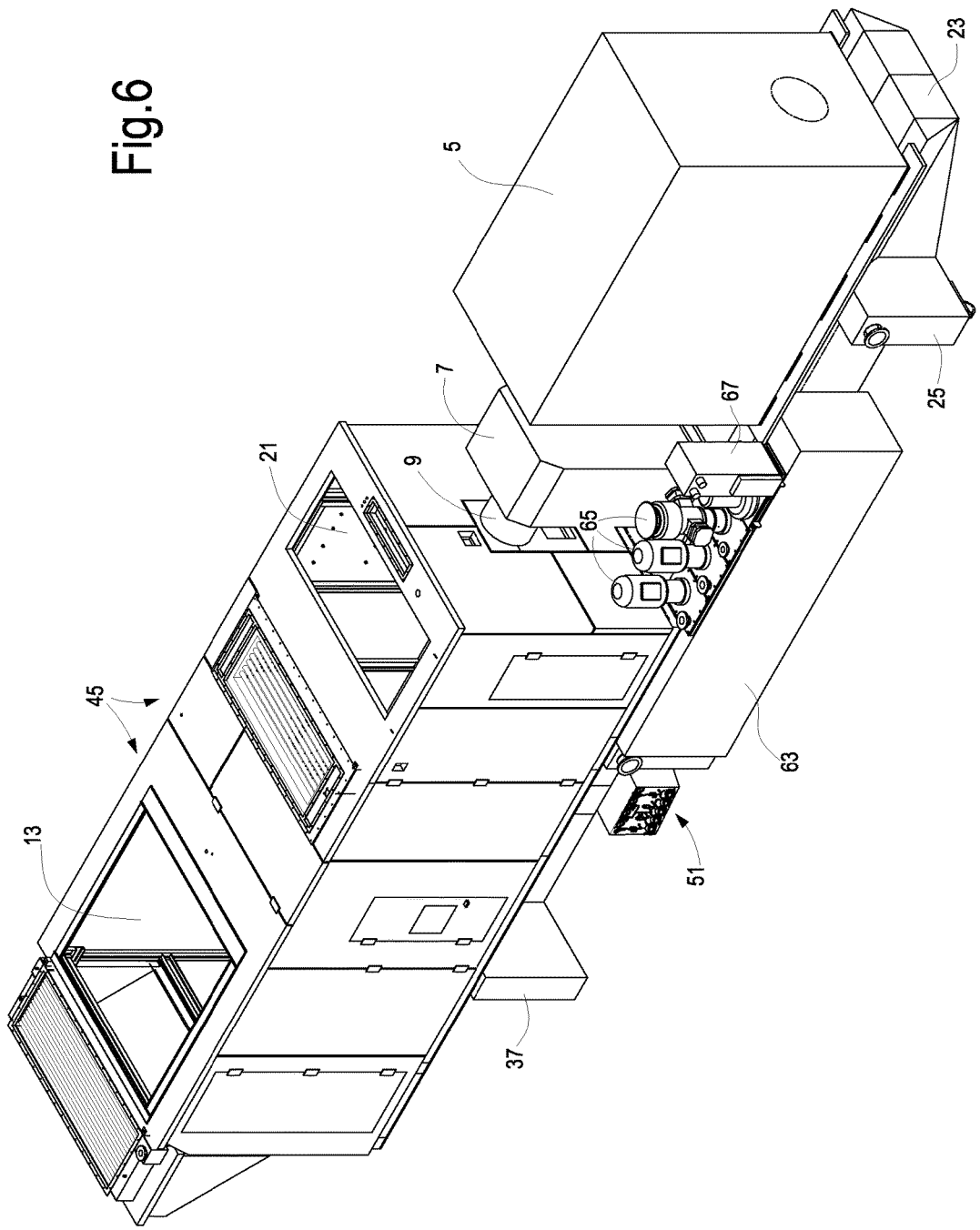
FIGS. 6 and 7 illustrate two different isometric views of the baseplate and relevant rotating machinery according to FIGS. 3, 4 and 5.
Figure 7:
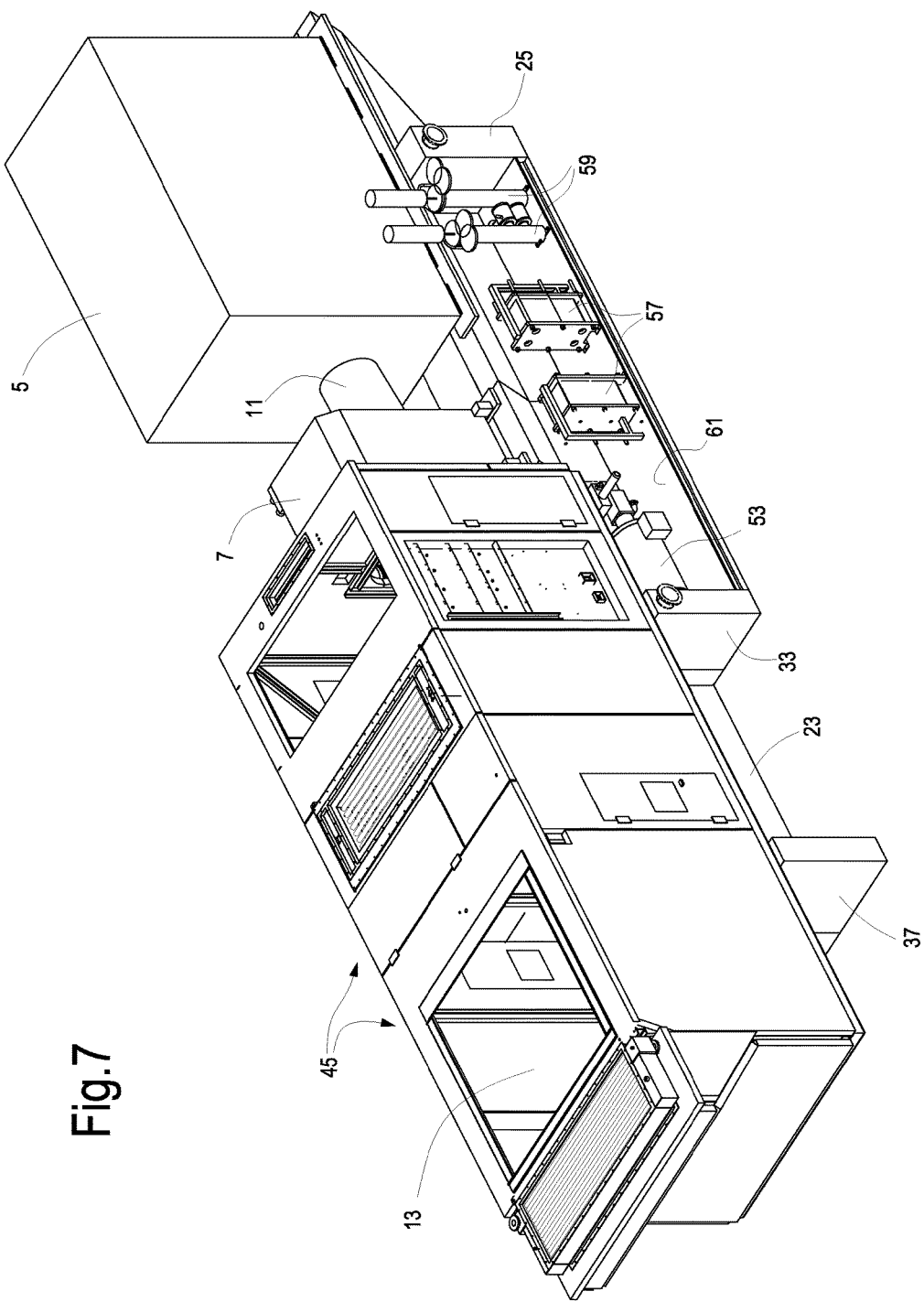

In some embodiments, the gas turbine 3, including the inlet plenum 13 and the exhaust gas collector 21 can be mounted on and supported by a support platform 39. The support platform 39 can be formed by longitudinal and transversal beams 41, 43, forming a load bearing structure which can be acoustically insulated if required. The support platform 39 is connected to the elongate torsion and bending resisting member 23 in a rigid manner, and more particularly in a torque transmitting relationship. The support platform 39 further supports a gas turbine acoustic enclosure 45, which has been omitted in FIGS. 3, 4 and 5 and is shown in FIGS. 6, 7 and 9.

In some embodiments the support platform 39 can extend beyond the longitudinal end of the elongate torsion and bending resisting member 23 in an overhanging or cantilever fashion, as shown in particular in FIG. 3. A free space 47 (FIG. 3) is thus formed between a deck D, on which the baseplate 1 is mounted, and the support platform 39.

In some embodiments the load 5 can be supported by a separate support platform 49, rigidly connected to the elongate torsion and bending resisting member 23, more particularly in a torque transmitting relationship. In other embodiments, not shown, both rotating machines (gas turbine 3 and load 5) could be supported by one and the same support platform extending lengthwise along the elongate torsion and bending resisting member 23 and placed on top thereof.

In an embodiment, the total vertical extension H of the elongate torsion and bending resisting member 23 and the support members 27, 29 and 31 (see FIG. 3 and FIG. 5) is such that a person can access the space underneath the support platforms 49 and 39 in an erected position gaining access to apparatus, devices and auxiliary members of the gas turbine 3 and load 5, which can be located under the level of the support platforms 39 and 49.

By way of example, in some embodiments, a fuel skid, for example a gas skid 51, can be arranged under the support platform 39. The fuel skid 51 becomes thus entirely accessible by the personnel in charge of operation and maintenance of the rotating machinery directly and without the need of stepping on the baseplate 1.

The sidewalls of the elongate torsion and bending resisting member 23 and of the cross-members 25, 33, 37 are sufficient to mount thereon or house therebetween a plurality of additional auxiliary devices, which thus become accessible from below the support platforms 49, 39.

The additional cross-members 33, 37 are indeed provided for the purpose of increasing the vertical developing surface available for the installation of auxiliary devices and components, should the surface available on the elongate torsion and bending resisting member 23 and the load bearing cross-members 25 not be sufficient to receive all of the auxiliary devices and facilities which can be placed under the support platforms 39, 49. As a matter of fact, as mentioned above, these additional cross-members 33, 37 do not have any specific load bearing function as far as the baseplate 1 is concerned. Lifting lugs can be arranged at the cross members 33 and 37 or in a different location on the baseplate, for complete skid or baseplate handling. Additional walls, provided with access maintenance doors, can be added to close the space available for auxiliary installation underneath platforms 39 and 49.

In some embodiments a gas turbine starter 53 can also be arranged along the vertical surface available on the elongate torsion and bending resisting member 23 or in the area between the deck D and the lower surface of the support platforms 39, 49, as shown for example in FIG. 3.

The electric control panels of the gas turbine 3 and of the load 5 can also be placed on or against the vertical side surfaces of the elongate torsion and bending resisting member 23 and/or of the cross-members 25, 33, 37. Two such electric panels are schematically shown at 55 (FIG. 3).

In some embodiments auxiliary devices of the lubrication circuit are also arranged in the space made available under the level of the support platforms 39, 49 within the footprint thereof. By way of example, oil-cooling heat exchangers 57 as well as oil filters 59 can be located under the support platforms 39 and 49, between the load bearing cross-member 25 and the additional cross-member 33 (see in particular FIG. 6). In some embodiments a bottom frame 61 can be arranged between those cross-members 25, 33, forming a mounting surface for the heat exchangers 57 and filters 59. On the opposite side of the elongate torsion and bending resisting member 23 (see FIG. 6) a lubrication oil tank 63 can be positioned in the space available between the load bearing cross-member 25 and the additional cross-member 33. On top of the lubrication oil tank 63 oil pumps 65 and other auxiliary devices, for example an oil-vapor separator 67 can be arranged.

The space and the surfaces available along the elongate torsion and bending resisting member 23 and the cross-members 25, 33, 37 allow the major part of the auxiliary devices of the rotating machinery to be moved from the top of the baseplate 1 to a position under the support platforms 39, 49. In this way, a reduction of the overall footprint of the baseplate 1 with respect to the baseplates of the current art is obtained. On the other hand these auxiliary devices and facilities are readily accessible by the staff in charge of the operation and maintenance of the machinery, reducing maintenance time as well as risks connected to the servicing and maintenance operations requiring access to the auxiliary devices and facilities.

The space 47 made available under the gas turbine plenum 13 by mounting the gas turbine so that it projects partly in an overhanging or cantilever fashion beyond the longitudinal end of the elongate torsion and bending resisting member 23 can form a useful passageway, particularly when two or more baseplates 1 and relevant rotating machinery are arranged side-by-side, one adjacent to the other.

The height H can range for example between approximately 1.80 and approximately 3.00 meters, more particularly between 2.00 and 2.50 meters. A minimum height of 2.20 meters is particularly suitable for allowing easy access to personnel; a larger dimension can be adopted should this be required for example in order to house a larger number of auxiliary devices under the support platforms 39, 49 and/or if this is required to increase the torsional strength of the elongate torsion and bending resisting member 23 or for other reasons.

Moving several of the auxiliary devices from the interior of the gas turbine package 45 and/or more generally from the upper surface of the support platforms 39, 49, has additional important benefits. Temperature sensitive devices are moved away from hot areas of the gas turbine, reducing the risk of malfunctioning. Removing auxiliary devices from the top of the baseplate 1 and in particular from the gas turbine package allows a reduction of the cross-dimension W of the baseplate and therefore a reduction of the overall footprint, which is particularly beneficial in offshore applications.

The space available under the support platform 39 between the cross-members 33 and 37 can also be used to house turbomachinery components (e.g. gas generator 15 or power turbine 19 of the gas turbine 3) or the entire gas turbine, requiring maintenance or replacement. The support platform 39 can be provided with a through aperture allowing removal of the turbomachinery requiring maintenance or replacement and move the machinery in the empty space available under the support platform 39. If the cross-member 37 is omitted or is provided only on one side of the elongate torsion and bending resisting member 23, the turbomachinery moved under the support platform 39 can also be transported away passing underneath the support platform 39 along the passageway formed by the space 47. This is particularly useful in case of two or more baseplates arranged side-by-side, since no intermediate space is required between adjacent baseplates 1 for the purpose of maintenance and turbine removal operations.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A baseplate for mounting and supporting rotating machinery, the baseplate comprising:
   a central elongate torsion and bending resisting member;
   at least a first load bearing cross-member extending transversely to the elongate torsion and bending resisting member; and
   at least one machinery support platform rigidly connected to said elongate torsion and bending resisting member and to said first load bearing cross-member, wherein the rotating machinery is mounted on the at least one machinery support platform;
   wherein said elongate torsion and bending resisting member comprises vertically extending longitudinal lateral walls, where along auxiliaries of said rotating machinery are supported;
   wherein the machinery support platform projects sideways beyond the longitudinal lateral walls of the elongate torsion and bending resisting member; and
   wherein the elongate torsion and bending resisting member has a vertical extension sufficient for an operator to access said auxiliaries maintaining an erected and ergonomic position and accessing a space underneath said machinery support platform.

2. The baseplate according to claim 1, wherein said lateral walls are planar.

3. The baseplate of claim 1, wherein said at least one load bearing cross-member has vertically extending lateral walls for supporting auxiliaries of the rotating machinery.

4. The baseplate of claim 1, further comprising at least an additional cross-member, extending parallel to said first load bearing cross-member and distanced therefrom along the longitudinal extension of the elongate torsion and bending resisting member.

5. The baseplate of claim 1, wherein the elongate torsion and bending resisting member has a box-shaped structure.

6. The baseplate of claim 1, further comprising only three spaced support members, one of said support members being connected to a bottom surface of the elongate torsion and bending resisting member and two of said three support members being connected to a bottom surface of the first load bearing cross-member, in respective positions generally symmetrical with respect to the elongate torsion and bending resisting member.

7. The baseplate of claim 1, wherein said machinery support platform projects in an overhanging manner from one longitudinal end of said elongate torsion and bending resisting member.

8. The baseplate of claim 1, wherein said auxiliaries include one or more of the following: a fuel skid; a turbine starter; a lubrication oil tank; lubrication oil filters; lubrication oil pumps; vapor separator for the oil tank; lubrication oil heat exchangers; or electric control panels.

9. A turbomachinery system comprising:
   rotating machinery including at least a gas turbine and a load driven in rotation by said gas turbine; and a baseplate comprised of:
- a central elongate torsion and bending resisting member;
- at least a first load bearing cross-member extending transversely to the central elongate torsion and bending resisting member, the central elongate torsion and bending resisting member extending generally parallel to a rotation axis of the gas turbine; and
- at least one machinery support platform rigidly connected to said elongate torsion and bending resisting member and to said first load bearing cross-member, whereon the rotating machinery is constrained and supported, wherein the rotating machinery is mounted on at least one machinery support platform;
- wherein said elongate torsion and bending resisting member comprises vertically extending longitudinal lateral walls, where along auxiliaries of said gas turbine are supported;
- wherein the machinery support platform projects sideways beyond the longitudinal lateral walls of the elongate torsion and bending resisting member; and
- wherein the elongate torsion and bending resisting member has a vertical extension sufficient for an operator to access a space underneath said machinery support platform where said auxiliaries are located, maintaining an erected and ergonomic position.

10. The system of claim 9, wherein the turbine is housed in a turbine acoustic enclosure, which projects in an overhanging manner beyond a longitudinal end of said elongate torsion and bending resisting member.

11. The system of claim 9, wherein the load comprises a centrifugal compressor, pump, or an electric generator.

12. The system of claim 9, wherein said rotating machinery comprises a speed reducer or multiplier load gear arranged between the gas turbine and the load, said speed manipulating device including an inlet shaft drivingly connected to the gas turbine and an output shaft drivingly connected to the load.

13. The system of claim 12, wherein the inlet shaft and the outlet shaft of
said speed reducer or multiplier load gear are arranged in vertical superposed relationship, minimizing a transverse dimension of the machinery support platform.

14. The system of claim 9, wherein said longitudinal lateral walls of the elongate torsion and bending resisting member are planar.

15. The system of claim 9, wherein said at least one load bearing cross-member has vertically extending lateral walls for receiving auxiliaries of the rotating machinery.

16. The system of claim 9, wherein said baseplate further comprises at least an additional cross-member, extending parallel to said first load bearing cross-member and distanced therefrom along the longitudinal extension of the elongate torsion and bending resisting member.

17. The system of claim 9, wherein the elongate torsion and bending resisting member has a box-shaped structure.

18. The system of claim 9, further comprising only three spaced support members, one of which is connected under the elongate torsion and bending resisting member and the other two are connected under the first load bearing cross-member, in respective positions generally symmetrical with respect to the elongate torsion and bending resisting member.

* * * * *